United States Patent [19]

Redin

[11] Patent Number: 4,677,575

[45] Date of Patent: Jun. 30, 1987

[54] ARRANGEMENT TO GENERATE DIFFERENT FIGURES IN A COMPUTER CONTROLLED PRESENTATION SYSTEM ON A SCREEN

[75] Inventor: Dan B. Redin, Kungsängen, Sweden

[73] Assignee: Telefonaktiebolaget LM Ericsson, Stockholm, Sweden

[21] Appl. No.: 676,053

[22] PCT Filed: Mar. 27, 1984

[86] PCT No.: PCT/SE84/00110

§ 371 Date: Nov. 29, 1984

§ 102(e) Date: Nov. 29, 1984

[87] PCT Pub. No.: WO84/03967

PCT Pub. Date: Oct. 11, 1984

[30] Foreign Application Priority Data

Mar. 29, 1983 [SE] Sweden ............................... 8301750

[51] Int. Cl.[4] ......................... G06F 15/72; G09G 1/06

[52] U.S. Cl. .................................... 364/521; 340/723; 340/739; 340/747; 364/518

[58] Field of Search ................ 364/518, 521; 340/723, 340/736, 739, 744, 745, 747

[56] References Cited

FOREIGN PATENT DOCUMENTS 0016651 10/1980 European Pat. Off. .
0038411 10/1981 European Pat. Off. .

*Primary Examiner*—Errol A. Krass
*Assistant Examiner*—Kevin J. Teska
*Attorney, Agent, or Firm*—Roberts, Spiecens & Cohen

[57] ABSTRACT

Apparatus for generating figures on a display screen with vector segments being stored in a plurality of picture generators, the apparatus including a segment memory, a decoding unit, a dot memory, an edge memory and a mixer unit. The segment memory transmits a signal representing segment data for all vector segments associated with a given raster line. The decoding unit receives the signal from the segment memory and responds to the same. A determination is made with respect to the edge of a surface and as to whether this edge constitutes an illuminate or extinguish edge. The dot memory stores luminance and color information. The edge memory receives information from the decoding unit and includes circuitry for denoting what picture element is to be activated on a given raster line and the luminance value which has the highest priority with the activated picture element. The mixer unit receives signals from the dot memory and edge memory and forms a complete digital video signal.

5 Claims, 8 Drawing Figures

ARRANGEMENT TO GENERATE DIFFERENT FIGURES IN A COMPUTER CONTROLLED PRESENTATION SYSTEM ON A SCREEN

FIELD OF INVENTION

The present invention relates to an apparatus in a computer-controlled presentation system for generating pictures on a presentation screen provided with a raster, consisting of m.n. (i.e., m×n) picture elements where m is the number of lines in the picture and n is the number of picture elements per line.

BACKGROUND

Known methods of generating pictures on a presentation screen usually involve the picture being represented by picture's elements which are intermediately stored in a memory having m.n memory addresses before presentation, which results in large demands on memory capacity and high demands on the computing capacity in picture generators.

SUMMARY OF INVENTION

The present invention combines the low computing and memory capacity requirements associated with vector representation of pictures with large information density. There is furthermore enabled that complex pictures can be drawn with luminance equalization by limitedly long vector segments being able to be decoded in their entirety by pre-defined tables. Surfaces (area of the picture having uniform luminance and colour) may be represented by illumination and extinguishment edges, which is an advantage from the aspect of memory and computing capacity.

In achieving the above and other objects of the invention there is provided an apparatus for a computer controlled presentation system for generating images on a display screen divided into a raster comprising m×n picture elements wherein m equals the number of lines and n equals the number of picture elements per line and wherein each image is built up from a cohesive open or closed chain of a first or a second type of vector segment respectively each segment representing a symbol part or an edge of a surface, the vector segment is being stored in a plurality of picture generators each of which sends a signal representing the parameters of each vector segment.

In further accordance with the invention, the apparatus comprises a segment memory having an input and receiving at said input the signals from the picture generators, incoming data for the vector segment to the segment memory being arranged to be grouped in a linked list assigned to a given raster line such that when the memory is read out, the memory sends output signals representing segment data for all vector segments which are associated with a given raster line and successively for subsequent raster lines in a picture. Furthermore included is a decoding unit coupled to and receiving the output signals from the segment memory for carrying out in response to the output signals a decoding to picture elements in a given raster line for the first type of vector segment or for decoding illuminate and extinguish points in a given raster line for the second type of vector segments, a first output signal corresponding to the first type of vector segment being sent for denoting a starting point on a given raster line, at least for one picture element on the line, and a magnitude determining luminance of the picture element, a second signal being sent corresponding to the second type of vector segment for denoting the starting point for the picture element determining the edge of a desired surface and whether this edge constitutes an illuminate or extinguish edge.

Furthermore included in the apparatus of the invention as will be explained in detail hereinafter is a dot memory receiving the first output signal and including two memory units for storing luminance and colour information from the first output signal for all picture elements in two successive raster lines, reading into the first memory unit being arranged for performance simultaneously with reading out from the second memory unit and reading into the second memory unit being arranged for performance simultaneously with reading out from the first memory unit, said dot memory delivering an output signal representing luminance and colour information for each picture element of each raster line.

Furthermore included in the apparatus of the invention is an edge memory including a first and a second memory unit for alternatingly reading in and reading out the second signal obtained from the decoding unit, said edge memory containing information as to the position on a given raster line for the edge of said second type of vector segment, each memory unit of said edge memory storing data coming from the decoding unit for the vector segment which denotes luminance and information as to illuminate or extinguish edge in the order corresponding to the aforesaid position. Furthermore, there is included a priority decoder arrangement being connected to both of the memory units of the edge memory for giving an output signal from the edge memory for each raster line, the latter said signal denoting what picture element is to be activated on the raster line and also the luminance value which has the highest priority with the activated picture element.

Finally, in accordance with the invention, there is provided a display means and a mixer unit for receiving the output video signals from the dot memory and edge memory respectively such as to form a complete digital video signal which is sent to the display means.

The above and other objects and advantages of the invention will be found in the following detailed description and illustrated in the accompanying drawing.

BRIEF DESCRIPTION OF DRAWINGS

The invention will now be described in detail with reference to the accompanying drawings in which.

DETAILED DESCRIPTION

Figure 1:
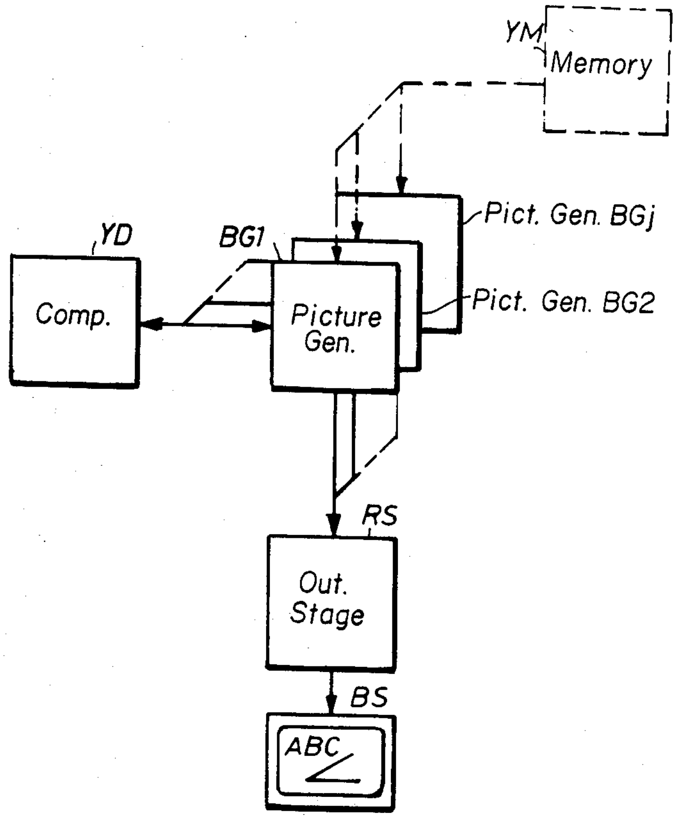
FIG. 1 is a block diagram schematically illustrating a presentation system in which the apparatus in accordance with the invention is utilized.

FIG. 1 illustrates an example of a system structure in which the present apparatus is utilized. A computer YD provides the rest of the system with control and checking information, which is received by a plurality of individual picture generators BG1, BG2, etc. The generators BG1–BGj build up the fractional components of the picture described by limitedly long vectors (segments) and send these to a raster output stage RS. Picture generation takes place at a rate such that "moving pictures" are obtained. Received segments are converted in the raster output stage LRS to a complete picture described by picture elements send out to a display screen BS. The signal out from the raster output stage RS contains luminance and/or colour information for the elements included in the picture, and is synchronous with the order in which the elements are drawn on the screen. In the description below it is assumed that the picture is built up by drawing the picture elements from left to right, raster line by raster line, starting at the uppermost raster line of the display. For obtaining "moving pictures", it is required that a new picture is drawn on the screen at least 20–30 times per second. The system may be used for a plurality of different raster formats and picture repetition frequencies.

All the picture generators BGl–BGj included in the system give output data of the same format to the raster output stage RS, enabling the total picture generation capacity to be dimensioned by suitable selection of the number of picture generators. Similarly, generators of different types may be used, e.g. general symbol generators intended for certain specific pictures.

For generating large quantities of predefined symbols, e.g. map pictures, certain picture generators may be connected to an external memory YM. The segment representation of figure contours together with illuminate and extinguish edge generation of surfaces in the picture generators allow functions such as translation, scaling, resolving and cutting of complex 2- and 3-dimensional pictures.

Figure 2:
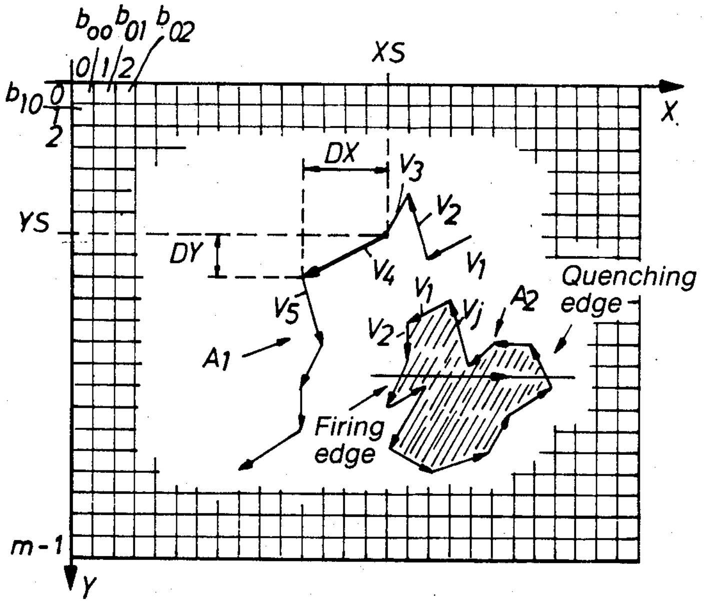
FIG. 2 illustrates a display screen and how two types of figures are presented with the aid of the present invention.

FIG. 2 illustrates how the figures of the picture are represented in the picture generators. The picture is here shown as a raster of picture elements $b_{00}$, $b_{01}$, $b_{02}$, which may have different luminance on the display screen BS (FIG. 1). The position of a raster line 1j is apparent from FIG. 2. A figure is built up as a cohesive chain of vector segments $v_1, v_2, \ldots v_j$. The figure may be an open chain of segments as in FIG. $A_1$, e.g. consisting of an alphanumerical character or a sequence as a long straight line generated by one of the picture generators, or as a closed chain of segments such as FIG. $A_2$, representing a surface. After possible translation, scaling, resolving and/or clipping of the segment in the picture generators, these transmit the segments to the subsequent raster output stage RS. At the interface between these units a segment is described by the following parameters:

XS, YS which are the starting coordinates for the segment in the image coordinate system (see FIG. 2)

DX, DY which are the segment projections on the X and Y axes, i.e. the orientation of the segment in the image.

L/F which is the segment luminance and/or colour code.

TYP which is a code stating whether the segment represents an illuminate edge, extinguish edge or a line, and in the latter case the width of the line.

Since the picture generators operate with variable segment length, the calculating capacity and resolution in figures may be balanced so that unnecessary calculations on simple figures can be avoided. However, in a typical realization there is a maximum segment length of substantially less than m, which is determined, inter alia, by memory dimensioning.

In accordance with the above, the fractional components of the picture may be defined as either lines or surfaces by the given code TYP. A line is shown on the display screen as a dash with a width of some few picture elements. Several different line widths can be used in the system. By "surfaces" is understood a larger area of the display screen with uniform luminance and colour. Surfaces are represented by illuminate and extinguish edges. In other words, for a given raster line and surface all the picture elements are activated from the illuminate edge of the surface to the extinguish edge of the surface on the line, reckoned from left to right on the picture, to the luminance and colour of the surface (FIG. 2). With this description of surfaces, only the contours of the surfaces need to be stored and processed in the picture generators.

A surface $A_2$ is represented in the picture generators as a cohesive, closed loop of segments such that the contour of the surface is predeterminedly followed either clockwise or anti-clockwise. If it is assumed that a surface contour does not cross over itself, this convention gives a simple way of determining what parts of the contour are illuminate or extinguish edges. This is determined per segment by the sign of DY, when this component is at right angles to the raster scanning direction. For example, if the anti-clockwise direction is used the following is obtained:

$DY > 0 => $ illuminate edge, $DY < 0 => $ extinguish edge.

This method is particularly valuable in resolving complex predetermined surfaces. In clipping surfaces to a given rectangular window in the picture, segments outside the limiting values of the X axis, but inside the limitations of the Y axis, must be projected on the respective X-limiting line.

Figure 5:
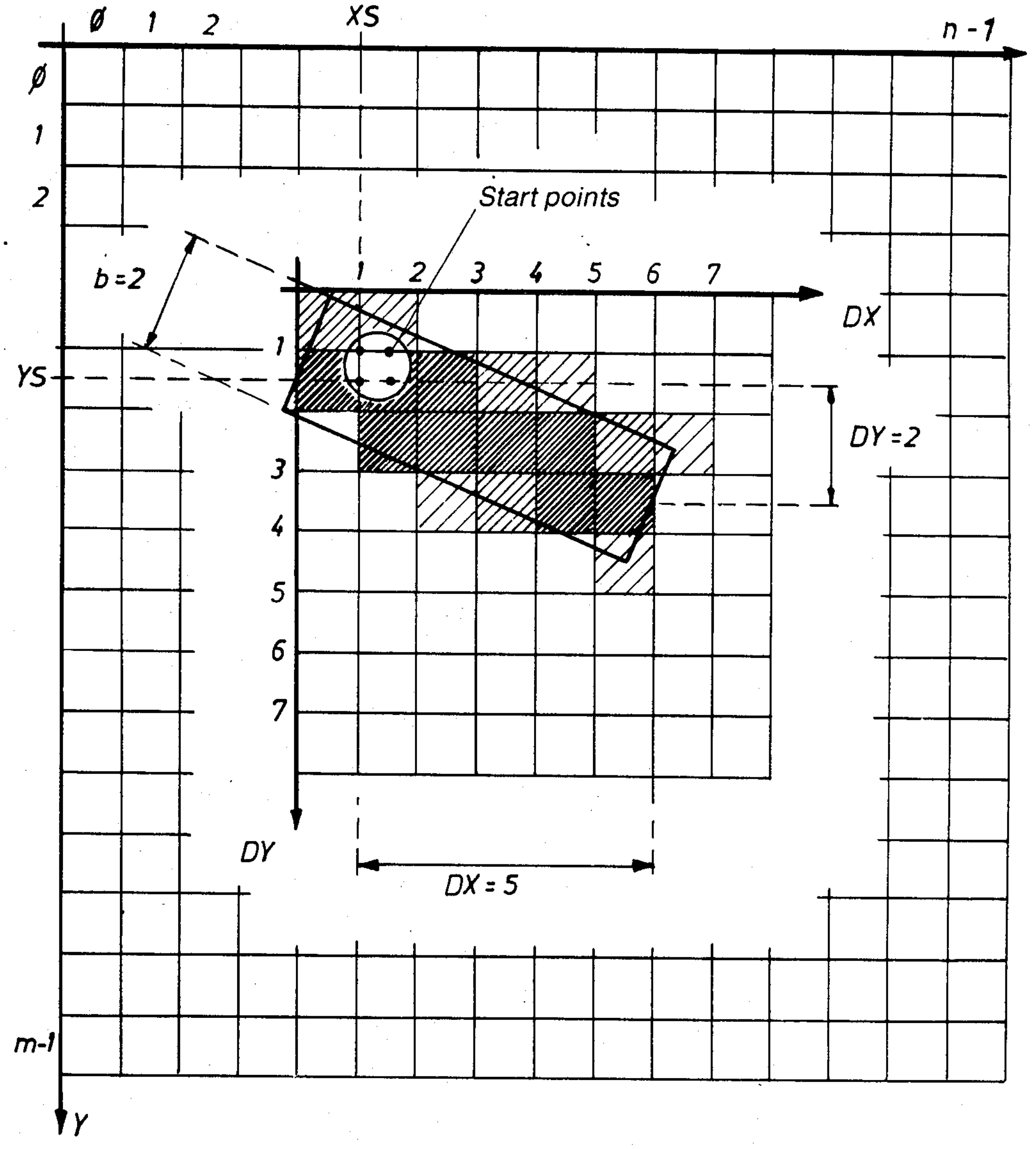
FIG. 5 illustrates the appearance of a line segment having a given width and with luminance equalization.

Both lines and edges of surfaces can preferably be drawn with luminance equalization, which means that the unevenness in a line or surface edge is reduced by assigning a reduced luminance to the picture element which affects a presented figure by only a fraction of its area. The lesser part of the picture element affecting the figure, the lower its luminance, in some quantisation. FIG. 5 illustrates how a line segment with the width of two picture elements is decoded with a two-step luminance equalization.

Overlapping fractional components in the picture, i.e. different figures affecting the same picture element, must be treated according to some convention such as:

lines are given priority before surfaces, and high luminances are given priority before low luminances (colours are assumed to have given ranking order).

For figures of line type, this priority is given after decoding to picture elements, by comparison of the elements per raster line. For surfaces, the representation with illuminate and extinguish edges enables giving priority per raster line without comparison element by element.

Figure 3:
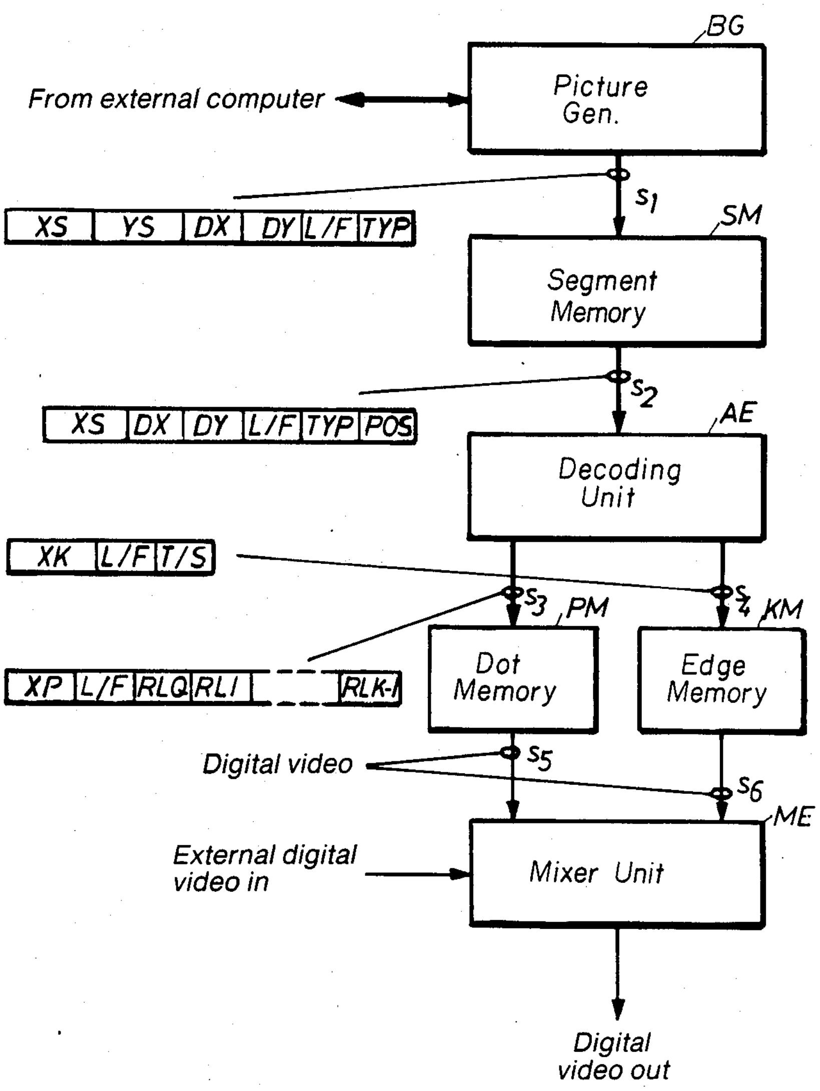
FIG. 3 is a block diagram of a part of the system according to FIG. 1, and is provided for explaining in detail the apparatus in accordance with the invention.

Referring now to the block diagram according to FIG. 3, a functional description of the present invention will be given. FIG. 3 illustrates functional units and the principle data flow between the units. The apparatus in accordance with the invention contains three different memories for intermediate storage of all data, namely a segment memory SM, a dot memory PM and an edge memory KM. A decoding unit AE is connected between the segment memory SM and both memory units PM, KM.

The segment memory is a buffer for the vector segments ($v_1$, $v_2$, etc, according to FIG. 2) which build up the figure or figures to be presented on the display screen. The segment memory LSM may be a read-write (RAM) of a known kind, segments being read out for the picture which is presented, while segments for the next picture are written into the memory. The segment memory SM accordingly has a capacity for storing all the segments for a picture. The input signal $s_1$ to the memory is a composite binary signal with information about the magnitudes XS, YS, DX, DY, L/F (luminance, colour) and TYP. The output signal $s_2$ is a composite binary signal, where $s_2$=(XS, DX, DY, L/F, TYP, POS), where POS is a binary value denoting the position of the vector segment relative to a raster line to which the segment is related (see below). The signal $s_2$ contains information on the vector segments per raster line, the parameter YS thus not being necessary in $s_2$.

Segments received from a picture generator, e.g. BG1, will be written into the segment memory. To simplify the sorting of segments in a raster line direction, which takes place on writing in, the segments pointing upwards in the picture are "reversed". I.e. if DY>0 is carried out:

XS:=XS+DX,

YS:=YS+DY,

DX:=−DX, and

DY:=−DY.

Figure 4:
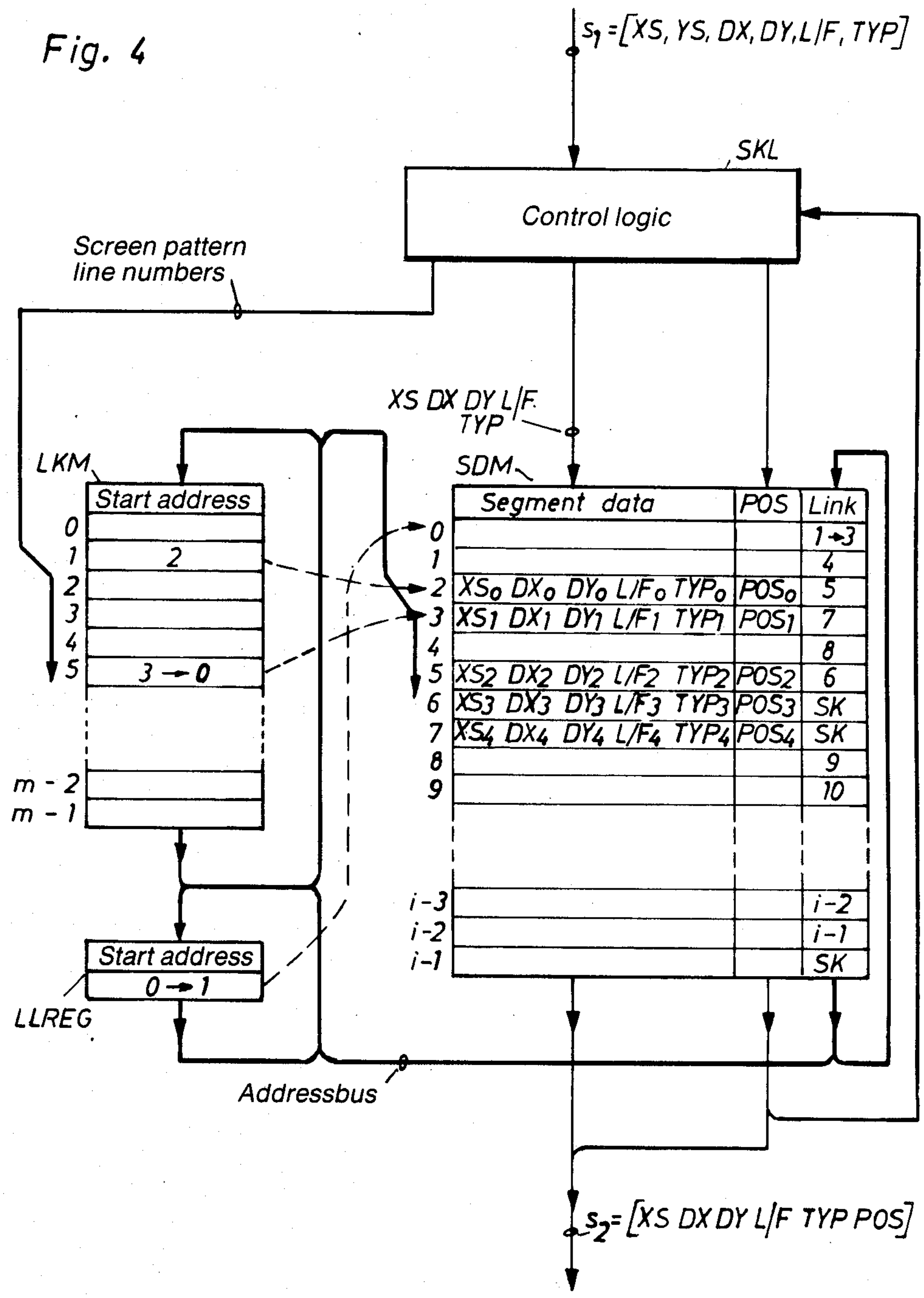
FIG. 4 more closely illustrates the appearance of a segment memory according to FIG. 3.

The segment memory SM comprises, according to FIG. 4, a link memory LKM, a segment data memory SDM, a register LLREG for storing the starting address to a so-called unoccupied list, and control and checking logic SKL for checking the read-in and read-out of the memories, reversing segments according to the above and generating the parameter POS.

The link memory LKM stores a starting address for each raster line 0.. (m−1), which indicates data in the segment data memory SDM. The segment data memory SDM includes i addresses where each address can store data for one segment and i corresponds to the maximum number of segments which can constitute a picture. Segment data are stored for a segment, i.e. the parameters XS, DX, DY, L/F and TYP, a parameter POS stating the position of the segment relative to the raster line to which the segment is assigned, and an address (link) pointing out another segment in the memory SDM which is assigned to the same raster line. In this way, all segments are tied together which are assigned to a given raster line together with a so-called linked list (group). The last segment in a linked list carries a special end code SK in the position for the link address. The starting address for a linked list is given by data in the link memory LKM on an address corresponding to the raster line number. For each raster line 0.. (m−1) the link memory thus stores a starting address indicating the first segment in the corresponding linked list.

This organization enables only the total number of segments in the picture to be determined on dimensioning the segment memory ISM. It is thus not necessary to have available a number of memory cells in the memory SDM equal to the number of groups times the maximum number of segments per group.

Apart from the linked list for each raster line, the segment memory SM contains a further linked list, a so-called unoccupied list with addresses to unoccupied memory cells in the memory SDM. Memory positions intended for segment data do not contain relevant data in this unoccupied list, and the list is used only for supplying unoccupied memory addresses on reading-in segments. The starting address for the unoccupied list is given by data in a register LLREG.

As an example, it has been selected in FIG. 4 to illustrate five segments (indexed 0-4) written into the SDM. Segments with the index 0, 2 and 3 are assigned to the raster line 1 and written-in on address 2, 5 and 6 in the SDM, respectively. Segments indexed 1 and 4 are assigned raster line 5 and are written-in on address 3 and 7 in the SDM. All remaining addresses in the SDM are assigned to the unoccupied list and in the example are linked in the address number order. The segments received and processed in a picture generator BG1 are written into the segment memory SM. One segment is linked-in onto the list corresponding to the raster line which is the uppermost raster line in the picture which the segment affects (all segments point downwards). The linking-in list is determined by YS, the segment width and slope. The segments are linked-in at the beginning of the respective list according to:

memory address for the segment is given by the first address in the unoccupied list, starting address in the link memory is put at being this new memory address, and the old starting address in the link memory LKM is written-in as a link in the memory SDM on the new memory address.

Let us now assume, with the segment data according to FIG. 4, that a new segment affecting the raster lines 5, 6 and 7 is received by the segment memory. The segment will then be assigned to the raster line 5 as the uppermost raster line affected by the segment. In writing-in of the segment, data is affected in FIG. 4 according to:

the parameters XS, DX, DY, L/F and TYP for the new segment are written in as segment data at address 0 in the memory SDM, since this address is pointed out by the register LLREG as the first in the unoccupied list. POS is set at 0, since the segment is assigned to the uppermost raster line which it affects.

Position 5 (raster line 5) in the starting address register LKM is changed from the starting address 3 to the starting address 0, since the new segment at address 0 is placed first in the linked list corresponding to raster line 5.

The link at address 0 in SDM is changed to 3 as being the old starting address for the raster line 5.

Furthermore, the starting address is altered in the register LLREG from 0 to 1, since the address 0 is now utilized and the next unoccupied address in the unoccupied list is 1.

The segments are read out from the segment memory in time with the raster lines. Segment data are read out during each raster line for all segments affecting the raster line standing in turn to be presented. This is performed by reading all segments in the list corresponded to by the raster line number. Reading-out of the list corresponding to the next raster line number is then performed, and so on.

Some segments affect more than one raster line (most of them are re-linked in reading-out so that the segment is re-written into the list corresponding to the raster line which is to be read out at the next cycle). The segments will thus be moved from list to list so that all segments affecting a raster line are found when this list is read out. In re-linking, the parameter POS is altered so that the parameter POS for each raster line to which the segment is assigned shows the position thereof relative to this raster line. In other words, POS gives the difference between the raster line number for the line which the segment is assigned to at the moment and the raster line which is the uppermost one the segment affects. When the last raster line which the segment affects has been displayed, the segment is re-linked to the unoccupied list instead, and there is thus created a new free memory address for writing-in segments associated with the next image.

In transferring segments from one line, e.g. $l_1$ to another line $l_2$, segment data do not need to be moved in the memory, and it is sufficient that the segment link and starting address for the list to which the segment is to be moved is changed according to:

new starting address for the list to which the segment is to go is given by the memory address for the segment, and the link in the segment is put to the old starting address.

Since segment data contain a position value POS, which gives the difference between the original raster line of the segment and the raster line where the segment is momentarily placed, the position of the segment in the picture may be determined relative to the appropriate raster line, which is used in subsequent decoding of the picture element.

Segments are received from the segment memory SM in time with the raster lines by the decoding unit AE. For a given raster line there is received in accordance with the above, data for all segments affecting this raster line. Relevant segment data out from the segment memory are $s_2$=XS, DX, DY, L/F, TYP and POS. Furthermore, there is included the fraction of YS giving part of the picture dot in input data in the cases where the resolution in XS, YS, DX and DY is better than one picture element.

Due to the limited segment length, the decoding unit AE may be two PROM memories, PROM 1 and PROM 2. By the conventional technique of table look-up in PROM 1, decoding to picture element in the raster line takes place for segments of line type, as well as the luminance equalizing part of the surface segment, and the result is sent to the dot memory PM. In a similar way, decoding takes place in PROM 2 to illumination and extinguishment dots in the raster line for surface segments, and the result is sent to the edge memory KM.

DX, DY and POS constituted the line segment width in PROM 1 and possibly the part of XS and YS giving a fraction of the image dot input data. Output data are k relative luminances RL, together with L/F determining the luminance and colour in k consecutive picture elements on the raster line for the segment in question, where k states the maximum number of picture elements a segment is permitted to include. Decoding is illustrated in FIG. 5 for a segment on a number of raster lines where k=8 has been assumed. It is further assumed in the Figure that the resolution in XS, YS, DX and DY is half a picture element so that four different "starting positions" in the raster are possible. The line width has been set at 2 picture elements, and furthermore it is assumed that the segment is decoded with one picture element extra length counted from the starting point, so that, play does not occur in a cohesive segment chain. A luminance equalization quantified to 2 steps is shown.

Input data in PROM 2 comprise DX, DY, POS and possible the part of XS and YS denoting a fraction of an image dot. Output data is a number addressed to XS and the result XK denotes where the illuminate or extinguish edge shall be positioned in the raster line. Information as to whether the segment is an illuminaite or extinguish edge is to be found in the TYPE code.

By decoding surface segments in PROM 1 as well, the surface contour will be drawn as a line, which gives luminance equalization for surface edges in a simple way.

Figure 6:
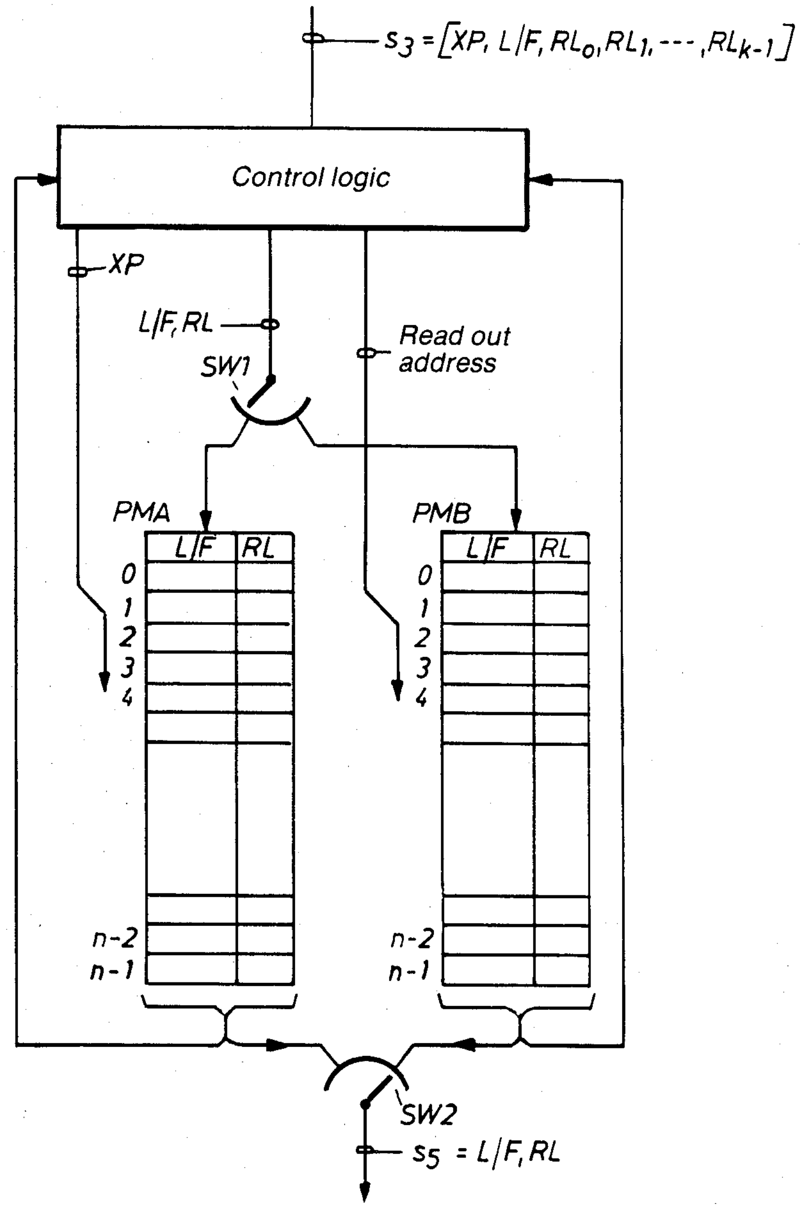
FIG. 6 more closely illustrates the appearance of a dot memory according to FIG. 3.

FIG. 6 illustrates the dot memory PM, which is divided into two memories PMA and PMB, together capable of storing luminance and colour information for all picture elements (n in number) in two raster lines. Each memory space 0, 1, 2 . . . in PMA and PMB corresponds to a picture element on the raster line. PMA and PMB operate alternatingly with the aid of a switch SW1, such that simultaneously as the picture elements for a raster line are read out from one memory, e.g. PMA, data is written into the other memory PMB for the next raster line. There is a further switch SW2 for reading out from the second memory PMB while reading into the first memory PMA and vice versa.

In accordance with the above, the dot memory receives the signal $s_3$=XP, L/F, $RL_0$, $RL_1$, $RL_2$ . . . , $RL_{k-1}$ from the decoding unit. XP states where in the raster line, i.e. from which memory space in PMA or PMB the write-in of the k picture elements should start, L/F states luminance and/or colour code for these picture elements and $RL_0$, $RL_1$, . . . $RL_{k-1}$ state the relative luminance for the subsequent picture elements. With the assumptions for decoding according to FIG. 5, k=8 picture elements are written to the right on the raster line counted from position XS−1 when DX>0, k=8 picture elements to the left of the raster line beginning at position XS+1 when DX<0.

With the quantifying of the luminance equalization assumed in FIG. 5, two bits are required for the relative luminance stating that the picture element is to be drawn with one of the following possibilities:

100% of nominal L/F

80% of nominal L/F

60% of nominal L/F or 0% of nominal L/F

The k picture elements obtained from the decoding unit AE are written conditionally into the dot memory PM according to the above.

With the assumptions which have been made above for giving priority to overlapping figures, the result is that a picture element with a given L/F code is written into the PM only if this code has higher priority than the L/F code (if any) already written-in in a corresponding position.

The content is read out for each raster line from the unit PMA or PMB which is to be fed out in time with the picture element being presented. This gives a digital "video signal" $s_5$ containing L/F and relative luminance.

Figure 7:
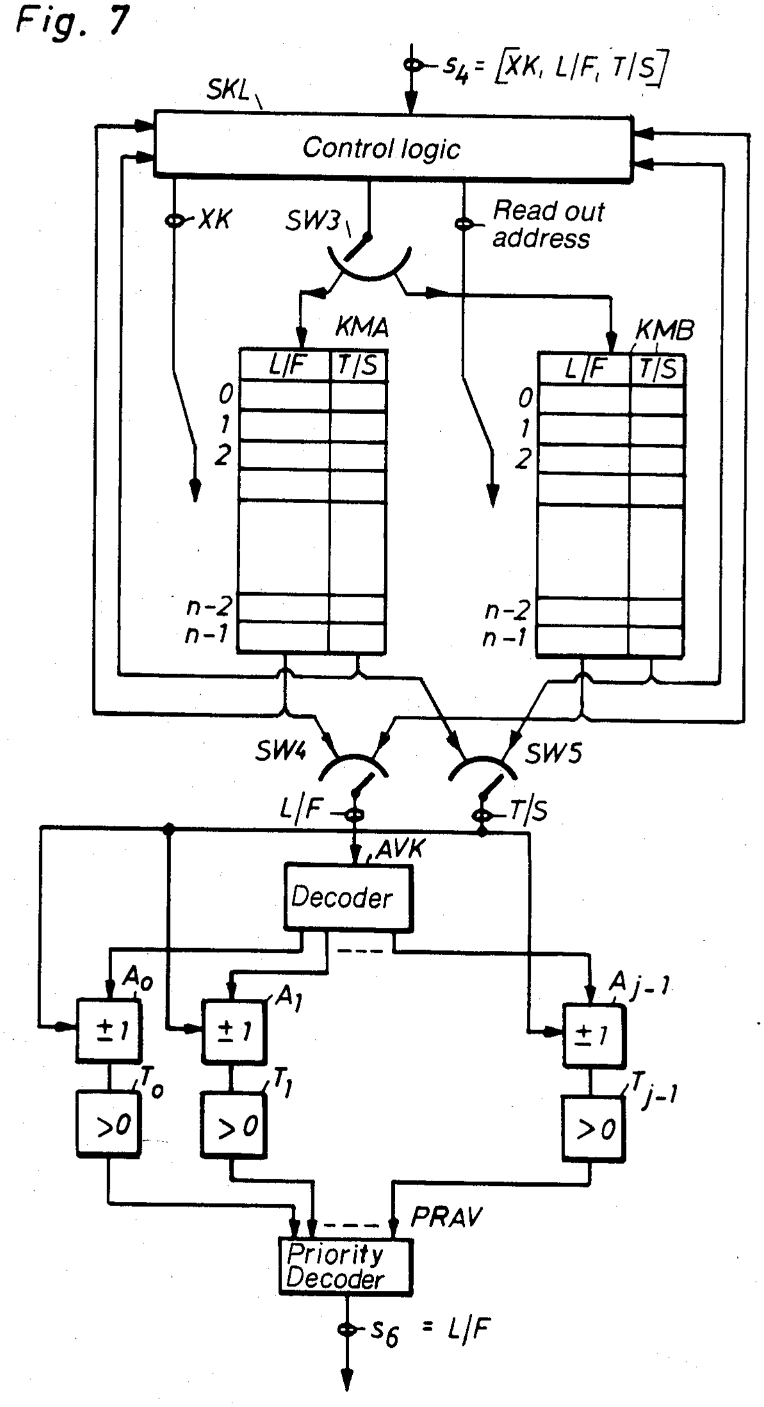
FIG. 7 more closely illustrates the appearance of an edge memory according to FIG. 3.

FIG. 7 illustrates the edge memory KM, comprising, as with the dot memory PM, two memory units KMA and KMB, operating alternatingly so that when reading into the unit KMA is performed, there is simultaneous read-out from the unit KMB and vice versa. Each unit contains a plurality of addressable memory spaces O-(n−1) equal to the number of picture elements n on a raster line.

Output data from the decoding unit AE, e.g. to the unit KMA, is XK (the x coordinate for the edge in a desired figure) L/F (luminance/colour) and T/S (illuminate or extinguish edge) which thus denotes whether it is an illuminate edge or an extinguish edge of a given luminance/colour which shall activate the picture element k (and those subsequent thereto if it is an illuminate edge) on the raster line. Each memory space in the unit KMA (and KMB) corresponds to a picture element on the raster line.

A control and checking block SKL divides the parameters of the incoming signal $s_4$ across two outputs, constituting address inputs to the memory units KMA and KMB, and a further output to a switch SW3 for data L/F and T/S. The switch SW3 is in one state (illustrated in the figure) when reading into the memory unit KMA and there is simultaneously reading out from the unit KMB. The outputs of the units KMA and KMB are connected to the switches SW4 and SW5 for controlling the alternating feed-out of the magnitudes L/F and T/S from the respective memory unit.

In order that a complete picture of a raster line can be stored in the edge memory, all the illuminate and extinguish edges for each L/F value must be stored. Since surfaces can be superposed, and start on the same picture element for a given raster line, a position in the raster line must be able to contain information about a plurality of illuminate and extinguish edges for each L/F value. For avoiding that this gives a memory with very wide data words per address, a special method with moving illuminate and extinguish edges is used.

The content is read out for each raster line from the unit (KMA or KMB) which is to be fed out and at the rate in which presentation is to take place. The L/F outputs of the units KMA, KMB are connected to a decoder AVK via both synchronous switches SW4, SW5, the decoder having a plurality of outputs equal to the maximum number of possible luminances. These outputs form inputs to the same number of accumulators $A_0$-$A_{j-1}$, which have control inputs connected to the outputs T/S of the memory units KMA, KMB. Each output of the accumulators $A_0$-$A_{j-1}$ is connected via threshold circuits (>0) $T_0$-$T_{j-1}$ to a priority decoder PRAV, which decides which of these inputs has the highest signal value and thus which accumulator has stored the highest value.

For each surface priority (L/F value with the assumption of giving priority to superposed figures in accordance with the above) there is an accumulator $A_0$-$A_{j-1}$, which successively stores the number of read-out illuminate edges minus the number of read-out extinguish edges for the respective surface priority L/F. The decoder AVK points out for each read-out surface priority (L/F value) the corresponding accumulator $A_0$-$A_{j-1}$. For example, if an illuminate edge with an L/F value=5 is read out from the unit KMA, the accumulator $A_5$ will thus be counted up by 1. If an extinguish edge with an L/F value of 3 is read out from the KMA, the accumulator $A_3$ will be reduced by the value 1. All the accumulators $A_0$-$A_{j-1}$ are set to zero before a new raster line is read out.

As long as a given accumulator assumes values greater than zero, the luminance and/or colour corresponding to the accumulator is activated on the raster line. According to previously assumed priority rules for superposed figures, the L/F value with the highest priority shall be written into the raster line. For this purpose, the detectors $T_0$-$T_{j-1}$ are connected to each accumulator. The output signals from the threshold detectors are received by the priority decoder PRAV, which for each picture element generates an L/F code corresponding to the threshold detector with the highest priority of all threshold detectors which indicate greater than zero. For example, if only $T_5$ is active the output value of 5 for the L/F value is given by the PRAV, while if both $T_5$ and $T_7$ indicate >0, the PRAV gives the output value of 7 for the L/F value. The result is thus a digital "video signal" $s_6$ containing L/F. The relative luminance is not in this signal, but can be imagined to exist and be constantly set to 100% of L/F.

For enabling a complete picture of a raster line to be stored in the edge memory, storage of all illuminate and extinguish edges for each L/F value must be enabled. Since surfaces can be superposed and start on the same picture element for a given raster line, a position in the raster line must contain information on a plurality of illuminate and extinguish edges for each L/F. To avoid this giving a memory with very wide data words per address, a special method with moving illuminate and extinguish edges is used.

Every memory address in the edge memory can store only one illuminate or extinguish edge. If the memory position does not contain previous data, input data is written into the position without any further measures. If there is an edge in the desired position already, the one of the input data and the existing edge having the highest priority is written into the position. The highest L/F value is given priority, for example. The other edge is moved to an adjacent position according to:
illuminate edge is moved to the right in the raster line, and
the extinguish edge is moved to the left in the raster line.

Should the new position also be occupied, the procedure is repeated until an unoccupied position is found for the edge with lowest priority, or until an illuminate and an extinguish edge having the same priority meet and are eliminated.

Figure 8:
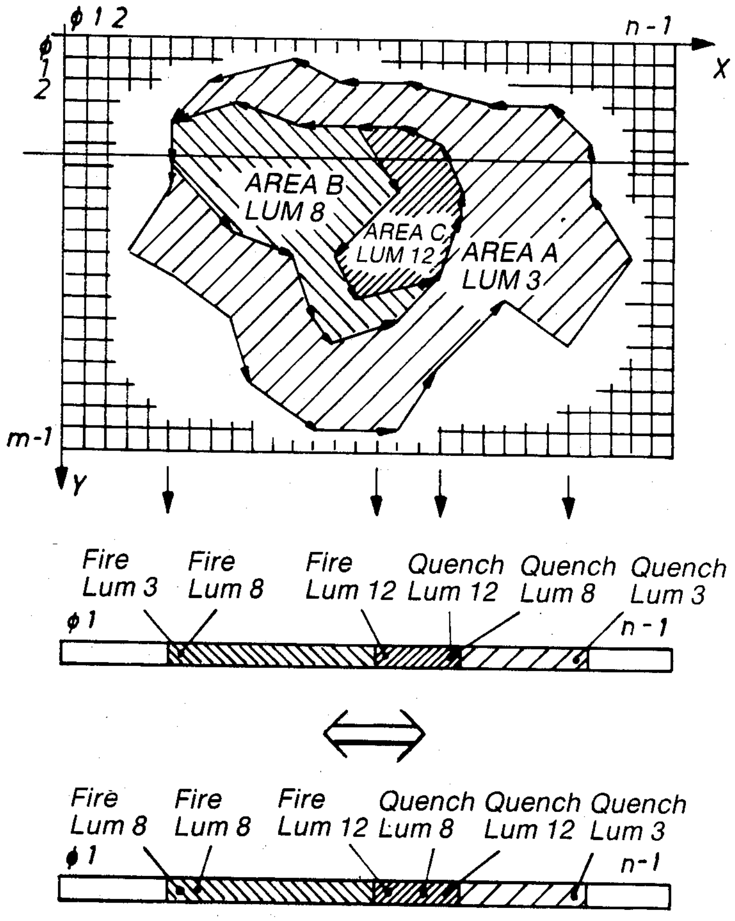
FIG. 8 illustrates partially coinciding surfaces with different luminance, for explaining the function of the edge memory according to FIG. 7.

FIG. 8 illustrates how illuminate and extinguish edges are moved for a raster line indicated in the figure. It should be noted that the appearance on the display screen of the raster line is not affected.

This method also simplifies handling information at read-out when only illuminate or extinguish edge is read out per picture element in the raster line.

The digital video signals which are read out from the dot memory and edge memory are mixed to a complete digital video signal. Mixing can take place according to the principles which have been accepted for giving priority to overlapping figures. Possibly, an external video signal can also be mixed in so that the result will be a picture generated by the system superposed on an externally received picture.

Presentation with optional colour and luminance may be obtained for the codes for L/F and the relative luminance with the aid of a final table look-up in a memory.

The final video signal is sent to the display screen, possibly after D/A conversion in the case where the display screen requires an analogue input signal.

A long straight line for presentation horizontally on the display screen normally requires that a large number of line segments are processed for this raster line, and for large information density and high up-dating rate of the picture this requires a large part of the total capacity for the number of segments which can be processed for a given raster line.

In certain applications, special processing of these cases may therefore be required. By identifying the special case of a long straight horisontal line in the picture generators they can draw these lines with the aid of a few illuminate and extinguish edges at suitable positions, instead of creating a plurality of line segments. The luminance equalization of these lines is obtained by creating several illuminate and extinguish edges with different luminance according to the same principles as for luminance equalization of line segments. The method gives luminance equalization calculated on the entire length of the line which, in certain cases further improves picture quality.

Depending on how the total number of L/F codes are to be used in the form of different luminances or colours, this method may require that codes for relative luminances are also inserted into the edge memory, However, this can be seen as a pure increase of the total number of L/F codes, and does not affect the described principles.

What is claimed is:

1. Apparatus for a computer-controlled presentation system for generating images on a display screen into a raster comprising $m \times n$ picture elements wherein $m$=the number of lines and $n$=the number of picture elements/line, and wherein each image is built up from a cohesive open or closed chain of a first or second type of vector segment respectively, each segment representing a symbol part or an edge of a surface, the vector segments being stored in a plurality of picture generators (BG1–BGj), each of which sends a signal representing the parameters (XS, YS, DX, DY, L/F, TYP) of each vector segment, said apparatus comprising:

(a) a segment memory (SM) having an input and receiving at said input the signals from the picture generators (BG1–BGj), incoming data for said vector segment to the segment memory (SM) being arranged to be grouped in a linked list assigned to a given raster line such that when the memory is read out said memory sends output signals ($S_2$) representing segment data for all vector segments which are associated with a given raster line (1j) and successively for subsequent raster lines (1j+1 etc) in a picture, (b) a decoding means (AE) coupled to and receiving said output signals ($s_2$) from the segment memory (SM) for carrying out in response to said output signals ($s_2$) a decoding to picture elements in a given raster line for said first type of vector segment (line) or for decoding illuminate and extinguish points in a given raster line for said second type of vector segments (surface), a first output signal ($s_3$) corresponding to the first type of vector segment being sent for denoting a starting point (XP) on a given raster line, at least for one picture element on the line, and a magnitude (L/F) determining luminance of the picture element, a second signal ($s_4$) being sent corresponding to said second type of vector segment for denoting the starting point (XK) for the picture element determining the edge of a desired surface, and whether this edge constitutes an illuminate or extinguish edge, (c) a dot memory (KM) receiving said first output signal ($s_3$) and including two memory units (PMA,PMB) for storing luminance and colour information from the first output signal for all picture elements in two successive raster lines, reading into the first memory unit (PMA) being arranged for performance simultaneously with reading out from the second memory unit (PMB) and reading into the second memory unit (PMB) being arranged for performance simultaneously with reading out from the first memory unit (PMA), said dot memory delivering an output signal ($s_5$) representing luminance and colour information for each picture element of each raster line, (d) an edge memory including a first and a second memory unit (KMA and KMB) for alternatingly reading-in and reading-out the second signal ($s_4$) obtained from the decoding unit, said edge memory containing information as to the position (XK) on a given raster line for the edge of said second type of vector segment, each memory unit (KMA or KMB) of said edge memory storing data coming from the second means (AE) for said vector segment which denotes luminance (L/F) and information as to illuminate or extinguish edge (T/S) of said edge in the order corresponding to said position (XK), a priority decoder means (AVK, $A_0$–$A_{j-1}$, $T_0$–$T_{j-1}$, PRAV) being connected to both memory units (KMA,KMB) of said edge memory for giving an output signal ($s_6$) from the edge memory (KM) for each raster line, the latter said signal denoting what picture element is to be activated on the raster line and also the luminance value which has the highest priority with the activated picture element, (e) a display means, and (f) a mixer means (ME) for receiving said output video signals ($s_5$ and $s_6$) from said dot memory (PM)L and edge memory (KM) respectively such as to form a complete digital video signal which is sent to said display means (BS).

2. Apparatus as claimed in claim 1 wherein the first and second memory unit (KMA,KMB) included in said edge memory (KM) each contains a plurality of memory addresses corresponding to the number of picture elements (n) in a raster line, and wherein there is stored in each memory address said luminance information (L/F) for a given picture element and also information (T/S) as to whether the picture element is an illuminate or extinguish edge, control and checking logic (SKL) being included in the edge memory for controlling the read-in and read-out of said information in both memory units (KMA, KMB) in the edge memory and for giving priority on the occurrence of luminance information (L/F) for a given picture element containing at least two like or unlike values, such that only one of these values is stored in the intended memory address (1, 2 . . . n) while the remaining value or values are stored in the subsequent or previous address in the respective memory unit (KMA, KMB) in the edge memory.

3. Apparatus as claimed in claim 2 wherein said priority decoding means comprises a decoding unit (AVK) having an input which is connected to the output of one of the memory units (KMA, KMB) of the edge memory across which the luminance information values (L/F) are obtained and to a plurality of outputs equal to the maximum number of possible luminance values, a plurality of controllable accumulators ($A_0$-$A_{j-1}$) connected to the outputs of the priority decoding means (AVK), said accumulators increasing or decreasing a value in response to an information value for the illuminate or extinguish edge (T/S) obtained from one of the memory units (KMA or KMB), of the edge memory, a priority decoder (PRAV) with a plurality of inputs and connected via threshold circuits ($T_0$-$T_{j-1}$) to the same number of outputs from the accumulators ($A_0$-$A_{j-1}$) for determining what value from the accumulators is greatest and thereby what luminance value which has greatest priority, said value constituting the output signal ($s_6$) of the edge memory.

4. Apparatus as claimed in claim 1, wherein the segment memory includes:

(a) a segment data memory (SDM) for storing incoming vector segment data (XS, DX, DY, L/F, TYP), data for each segment ($v_1-v_j$) being stored under a given address and in the order in which segment data come into the segment memory (SM), the segment data memory including memory space for storing said data together with associated link address space which gives the address to another data memory space in which data associated with another vector segment is stored associated to the same linked list, for each of said memory spaces, there being in the segment data memory further memory space (POS) which stores a value giving the difference between the order number of the segment assigned to a given raster line and the first raster line which the segment affects, (b) a link memory (LKM) containing a plurality of starting addresses for the segment data memory (SDM), each of these addresses being assigned to a linked list of vector segment data (XS, DX, DY, L/F, TYP) in the segment data memory, the link memory being adapted such that a starting address points out the memory space in the segment data memory containing data for the first vector segment (SXo, DXo, L/Fo, TYPo) in the linked list, in response to the order number of a raster line, and (c) a link address register (LLREG) pointing out the address to unoccupied memory space in the segment data memory (SDM) for each of the new, successively incoming vector segments simultaneously as the new address associated with the last incoming vector segment stored in the segment data memory is written into the link memory (LKM).

5. Apparatus as claimed in claim 1 wherein the memory units (PMA and PMB) included in the dot memory (PM) each contain a plurality of memory addresses corresponding to the number of picture elements (n) in a raster line, and wherein in each memory address there is stored said luminance colour information (L/F) for a given picture element, and also information (RL) as to the luminance which is to be given the picture elements following the given picture element, priority being given to said luminance colour information (L/F) such that a given value (L/F) is written into a given memory address only if this value has a higher priority than the value which is possibly already written into the memory address.

* * * * *